(12) United States Patent
Cortright

(10) Patent No.: US 8,706,169 B2
(45) Date of Patent: Apr. 22, 2014

(54) INTERFACE OVERLAY

(75) Inventor: David S. Cortright, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1925 days.

(21) Appl. No.: 11/617,283

(22) Filed: Dec. 28, 2006

(65) Prior Publication Data

US 2008/0163090 A1  Jul. 3, 2008

(51) Int. Cl.
*G06F 15/16* (2006.01)
*H04B 7/00* (2006.01)
*H04M 1/00* (2006.01)
*H04M 1/64* (2006.01)

(52) U.S. Cl.
USPC .. 455/566; 379/67.1; 379/88.17; 379/202.01; 455/519; 455/556.2; 709/206

(58) Field of Classification Search
USPC ............ 709/206; 455/519, 556.2, 566; 379/67.1, 88.17, 202.01
See application file for complete search history.

(56) References Cited

U.S. PATENT DOCUMENTS

| | | | | |
|---|---|---|---|---|
| 5,651,107 | A * | 7/1997 | Frank et al. | 715/768 |
| 5,999,191 | A * | 12/1999 | Frank et al. | 345/634 |
| 6,212,548 | B1 * | 4/2001 | DeSimone et al. | 709/204 |
| 6,278,454 | B1 * | 8/2001 | Krishnan | 715/846 |
| 6,996,783 | B2 * | 2/2006 | Brown et al. | 715/790 |
| 7,426,192 | B2 * | 9/2008 | Amano et al. | 370/261 |
| 7,639,634 | B2 * | 12/2009 | Shaffer et al. | 370/266 |
| 7,716,289 | B2 * | 5/2010 | Malik | 709/206 |
| 8,305,355 | B2 * | 11/2012 | Matas et al. | 345/173 |
| 2002/0171682 | A1 * | 11/2002 | Frank et al. | 345/790 |
| 2004/0078444 | A1 * | 4/2004 | Malik | 709/206 |
| 2004/0174392 | A1 * | 9/2004 | Bjoernsen et al. | 345/751 |
| 2005/0053214 | A1 * | 3/2005 | Reding et al. | 379/202.01 |
| 2005/0132009 | A1 * | 6/2005 | Solie | 709/206 |
| 2006/0036703 | A1 * | 2/2006 | Fulmer et al. | 709/207 |
| 2006/0161853 | A1 * | 7/2006 | Chen et al. | 715/758 |
| 2006/0168015 | A1 * | 7/2006 | Fowler | 709/206 |
| 2006/0256135 | A1 * | 11/2006 | Aoyama et al. | 345/629 |
| 2007/0143423 | A1 * | 6/2007 | Kieselbach et al. | 709/206 |
| 2007/0288560 | A1 * | 12/2007 | Bou-Ghannam et al. | 709/204 |
| 2008/0055269 | A1 * | 3/2008 | Lemay et al. | 345/173 |
| 2008/0059587 | A1 * | 3/2008 | Burtner et al. | 709/206 |
| 2008/0080679 | A1 * | 4/2008 | Fernandez et al. | 379/88.17 |
| 2009/0217199 | A1 * | 8/2009 | Hara et al. | 715/808 |
| 2010/0070889 | A1 * | 3/2010 | Weisbart et al. | 715/760 |
| 2011/0029629 | A1 * | 2/2011 | Burtner et al. | 709/206 |
| 2012/0172134 | A1 * | 7/2012 | Kelly et al. | 463/42 |
| 2013/0053001 | A1 * | 2/2013 | Vander Veen et al. | 455/412.2 |
| 2013/0097490 | A1 * | 4/2013 | Kotler et al. | 715/255 |
| 2013/0127980 | A1 * | 5/2013 | Haddick et al. | 348/14.08 |

* cited by examiner

*Primary Examiner* — Lisa Hashem
(74) *Attorney, Agent, or Firm* — James J. DeCarlo; Greenberg Traurig, LLP

(57) ABSTRACT

A method and apparatus for providing a user interface overlay. In one embodiment, a toolbar remains visible and can be selected at any time to activate the interface overlay. The interface overlay provides an easily visible list computing options, such as contacts, that overlays the entire display area. The background of the overlay may be semi-transparent so that underlying windows are still visible, but the list is highlighted. The list includes selectable display elements with display characteristics, such as size or color, that indicate one or more attributes associated with the corresponding computing options, such as a frequency of interaction with certain contacts. In one embodiment, groups of contacts can be sorted or filtered by the attributes before display. Each selectable display element identifies a contact and may indicate a current availability. A user selects a display element to initiate communication, such as an instant messaging chat session.

19 Claims, 6 Drawing Sheets

INTERFACE OVERLAY

FIELD OF ART

The present invention relates generally to visual computer interfaces, and more particularly to an overlay interface for choosing a single item from a list of items.

BACKGROUND

Stationary and mobile client devices typically include graphical user interfaces that enable a user to make selections from among a number of computing options to perform various tasks. The options may correspond to menu options, settings, data elements, and/or other options for an operating system, database, or application programs. One example application program is a communications program. Client devices often include one or more messaging capabilities such as instant messaging (IM), email, short message service (SMS), multimedia message service (MMS), and the like. Messages are typically exchanged over an electronic network, often through an online messaging service. Some messaging capabilities are provided by a client software module. Other messaging capabilities are provided through a browser that interfaces with a server-based messaging system. In either case, a user can generally store and view a listing of contacts. To access the contact list, a user typically displays a messaging window, or browser, over other windows. This is sometimes referred to as changing the focus to the messaging window. The user then usually selects a menu option to display the contacts list. Each entry in the contact list typically comprises a text name. Some messaging systems may also include a status indictor for each entry. For example, the current online availability of each entry may be displayed with each text name. Some messaging systems may also display an icon, avatar, or thumbnail image associated with some or all entries.

The entries are typically uniform in size, and typically include a scroll bar to scroll through the list of contacts. The visibility of the entries usually depends on the display size of the messaging window and an overall text-size setting. Some messaging windows, such as IM chat windows, are predefined to be relatively small. Notwithstanding the size of the messaging window, many messaging systems restrict the list of contacts to a subportion of the messaging window. Typically, a portion of the messaging window is reserved to display messages, such as chat text. These, and other factors, can make it difficult to distinguish the entries of a contact list.

The contacts are often sorted in alphabetical order. The user may also be able to manually organize the contacts into groups. Some systems enable a user to find one or more contacts with a name search and/or alphabetical filtering. Some messaging systems also keep a list of recent contacts, which generally consists of a sequential list of contacts in order of the most recent contact first. The visibility of the recent contacts also usually depends on one or more factors, such as those discussed above. The sequential listing typically does not indicate which contacts are accessed most often. Once a desired entry is identified, the user typically clicks on the text name or icon to initiate communication with the client associated with the selected entry. The above discussion of messaging systems illustrates one example of user interface issues in general that can be addressed with embodiments of the invention described below.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, a mobile device user, an online service subscriber, and/or other person using an electronic device.

One aspect of the invention relates to a method and apparatus for providing a user interface overlay. Among other things, one embodiment of the interface overlay provides an easily visible contact list that indicates an attribute associated with contacts, such as a frequency of interaction with certain contacts. The following discussion is directed to an example embodiment for a communication system. However, the invention is not so limited, and other embodiments provide an interface overlay for selecting computing options in other applications, operating system programs, and/or the like.

Illustrative Operating Environment

Figure 1:
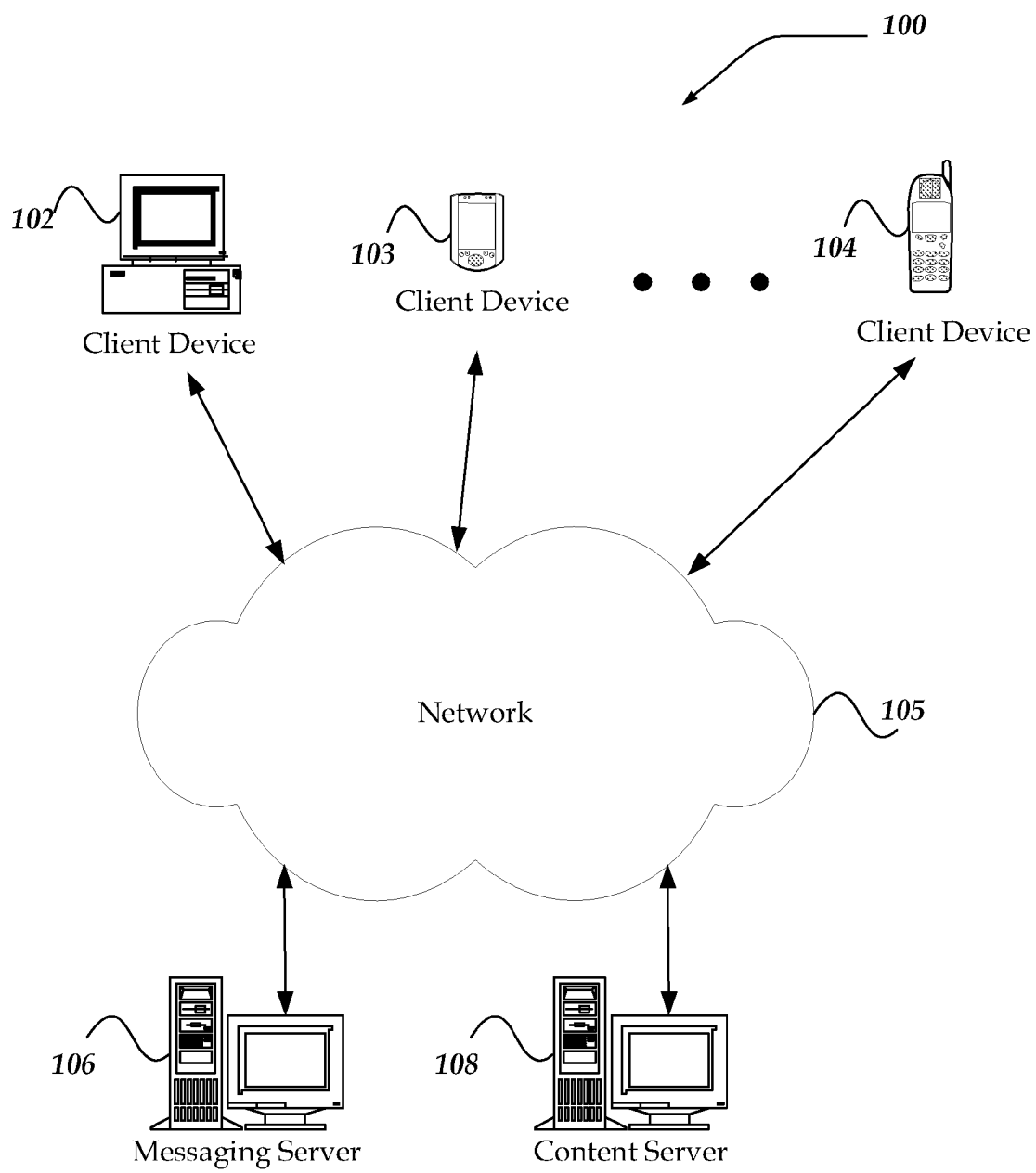
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, a messaging server 106, and a content server 108. Network 105 is in communication with and enables communication between each of client devices 102-104, messaging server 106, and content server 108.

Client devices 102-104 may include virtually any computing device capable of receiving and sending a message over a network, such as network 105, to and from another computing device, such as content server 108, each other, and the like. The set of such devices may include devices that typically connect using a wired communications medium such as personal computers, multiprocessor systems, microprocessor-based or programmable consumer electronics, network PCs, and the like. Similarly, client devices 102-104 may be any device that is capable of connecting using a wired or wireless communication medium such as a PDA, POCKET PC, wearable computer, and any other device that is equipped to communicate over a wired and/or wireless communication medium. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like.

Each client device within client devices 102-104 may include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like. Client devices 102-104 may further include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a wireless application protocol (WAP), a Handheld Device Markup Language (HDML), such as Wireless Markup Language (WML), WMLScript, JavaScript, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, messaging server 106, and/or content server 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof. By way of example, communication media includes wired media such as twisted pair, coaxial cable, fiber optics, wave guides, and other wired media and wireless media such as acoustic, RF, infrared, and other wireless media.

Additionally, communication media typically embodies computer-readable instructions, data structures, program modules, or other data in a modulated data signal such as a data signal, carrier wave, or other transport mechanism and includes any information delivery media. The terms "modulated data signal," and "carrier-wave signal" includes a signal that has one or more of its characteristics set or changed in such a manner as to encode information, instructions, data, and the like, in the signal.

Messaging server 106 and content server 108 may comprise multiple computing devices or a single computing device. Messaging server 106 may provide online services such as messaging, search, news, shopping, advertising, and/or the like. Content server 108 may provide similar service and/or other services such as web sites, online journals (e.g., blogs), photos, reviews, and the like. For exemplary purposes, the operations of messaging server 106 and content server 108 are described together, and generally refer to messaging server 106. Briefly, messaging server 106 may include any computing device capable of connecting to network 105 and may manage provide messaging services associated with a network user, such as a user of at least one of client devices 102-104. Devices that may operate as messaging server 106 include dedicated servers, personal computers, desktop computers, multiprocessor systems, microprocessor-based or programmable consumer electronics, network PCs, and the like.

Messaging server 106 may employ processes such as described in more detail below to send, receive, and manage messages, and enable a network user to maintain contact information for users of messaging server 106. Messaging server 106 and/or any of clients 102-104 may be implemented on one or more computing devices, such as a client described with regard to FIG. 2.

Illustrative Server Environment

Figure 2:
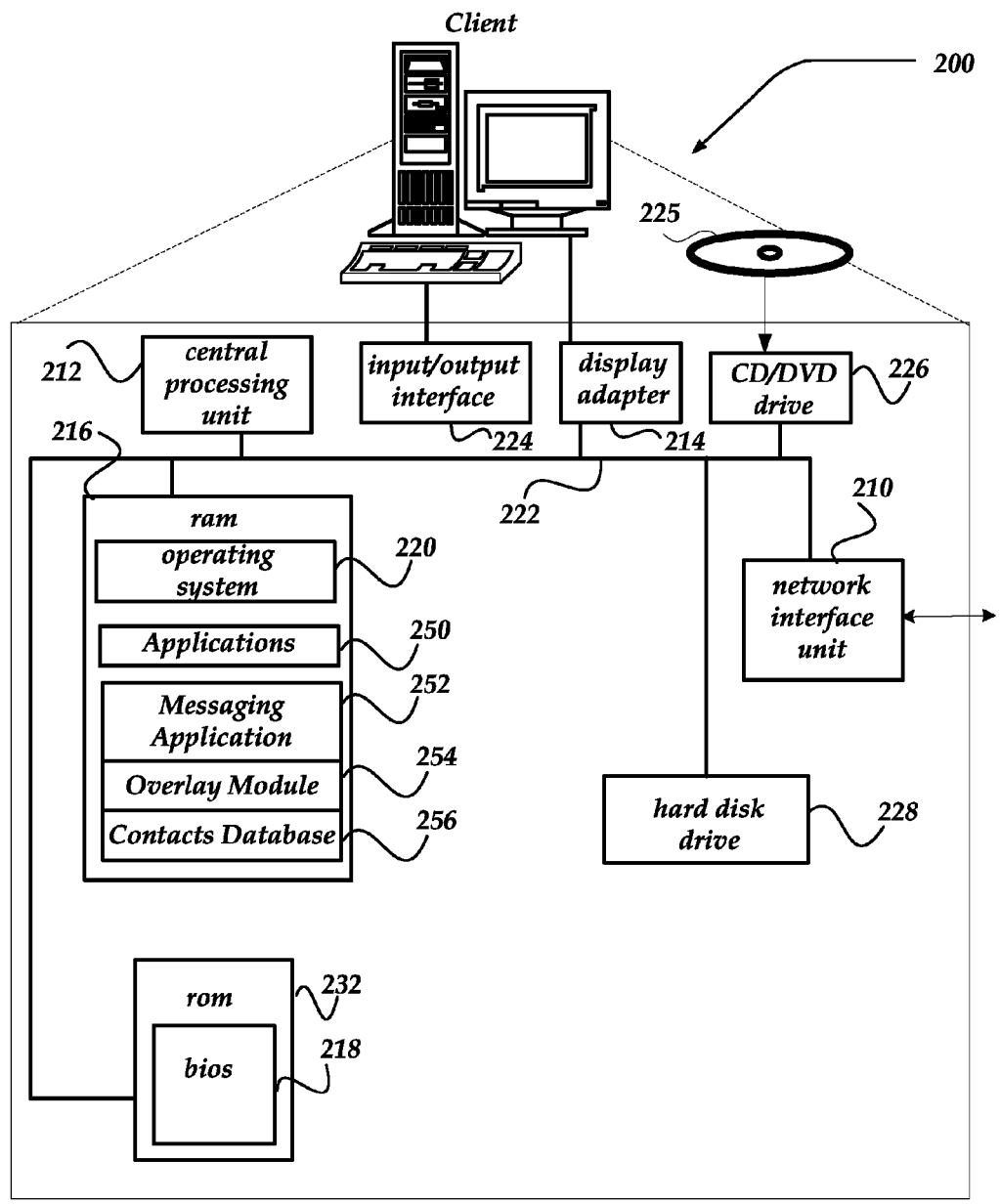
FIG. 2 shows one embodiment of a client device that may be included in a system implementing the invention.

FIG. 2 shows one embodiment of a client, according to one embodiment of the invention. Client 200 may include many more components than those shown. The components shown, however, are sufficient to disclose an illustrative embodiment for practicing the invention.

Client 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of client 200. Any general-purpose operating system may be employed. Basic input/output system ("BIOS") 218 is also provided for controlling the low-level operation of client 200. As illustrated in FIG. 2, client 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include browsers, schedulers, calendars, transcoders, database programs, word processing programs, spreadsheet programs, and so forth. Applications 250 may also include applications such as a behavior tracker, which may track a user's activities with the user's permission. The behavior tracker may track the user's local and/or network service behaviors (e.g., frequency of communicating with each contact, web searches, online purchases, frequency of posting blog entries, participation in particular network activities, etc.), and/or other behaviors.

Mass storage may further include modules for messaging, such as a messaging application 252 and an overlay module 254. Messaging application 252 may comprise an IM application, an email application, or the like. Overlay module 254 may be part of, liked to, or separate from the messaging application. The overlay module may be a software program and/or a set of data values that specify settings for the messaging program. In this embodiment, overlay module 254 works with messaging application 252 to manage display of interface overlays as described in further detail below.

Mass storage also includes a contacts database 256, which may be included with messaging application 252 and/or overlay module 254, or provided as a separate entity. Contacts database 256 may store names, network addresses, phone numbers, and/or other data for contacting other users.

Client 200 also includes input/output interface 224 for communicating with external devices, such as a mouse, keyboard, scanner, or other input devices not shown in FIG. 2. Likewise, client 200 may further include additional mass storage facilities such as CD-ROM/DVD-ROM drive 226 and hard disk drive 228. Hard disk drive 228 is utilized by client 200 to store, among other things, application programs, databases, messaging application 252, overlay module 254, contacts database 256, and the like.

Illustrative Client User Interface

Figure 3:
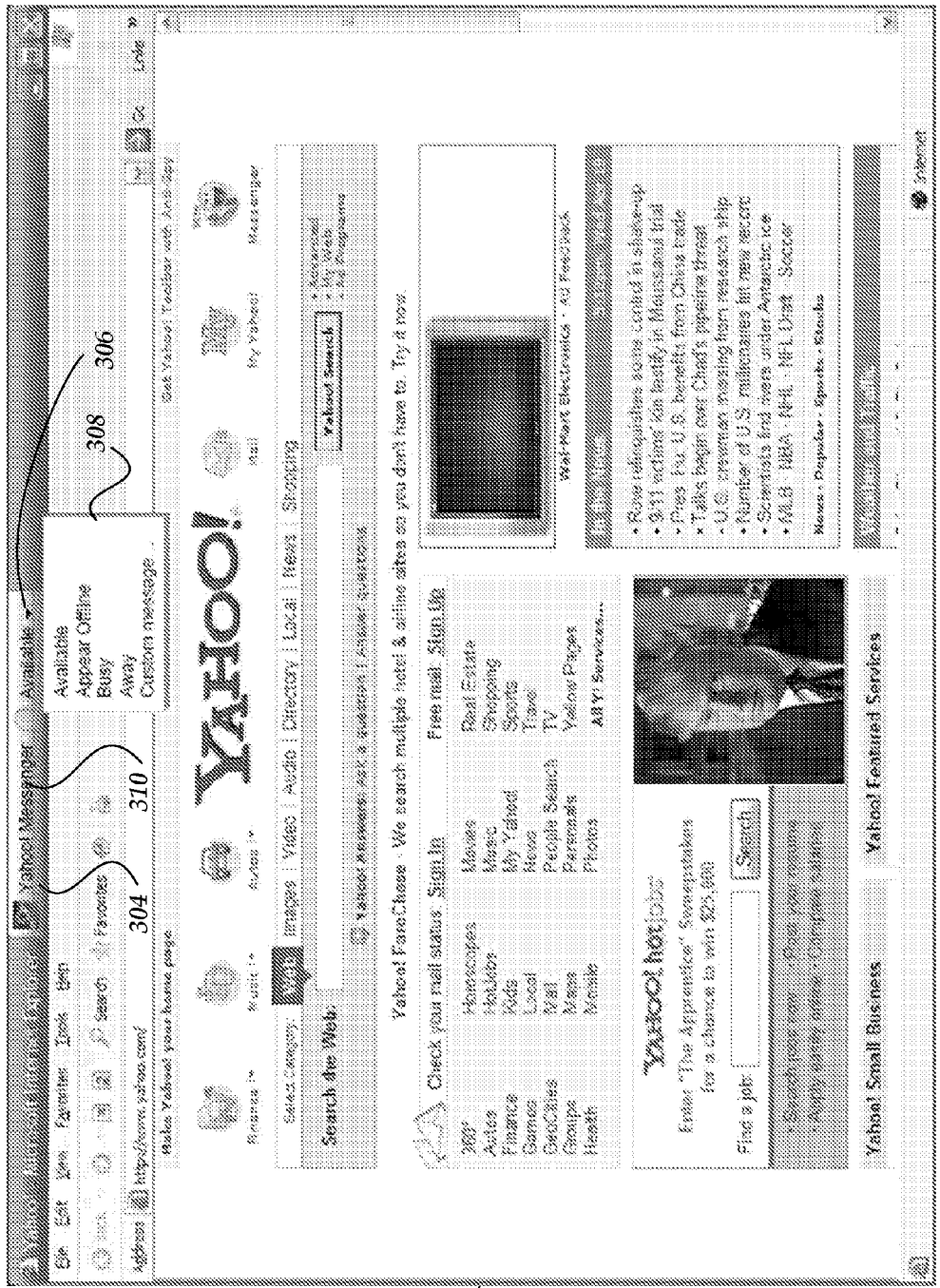
FIG. 3 shows a screen shot of a messaging client user interface, illustrating a sample messaging toolbar overlaying a display area.

A user interface and operation of certain aspects of an embodiment of the present invention will now be described with respect to FIGS. 3-5. FIG. 3 shows a screen shot of a display 300 that includes a browser window 302 and a sample messaging toolbar 304. In this embodiment, messaging toolbar 304 is displayed by a local messaging client, such as an IM client. The messaging toolbar may be displayed in a fixed location, such as at an upper edge of the display area to reduce its impact on the display area, yet remain easily accessible. A user may also drag the messaging toolbar to another location. To enable quick access, this messaging toolbar remains visible over other windows, such as browser window 302. Messaging toolbar 304 is considered to overlay browser window 302 and other objects that may be displayed. In alternate embodiments, the messaging toolbar may be displayed in a task bar, in a task tray, as a shortcut icon, and/or in another form of control element. In still further embodiments, there need not be a visual representation at all, but instead using a keyboard shortcut, a mouse gesture, a voice command, and/or alternative input method to invoke a module that embodies the invention.

Messaging toolbar 304 may include one or more indicators and/or selectable controls. In this example, messaging toolbar 304 includes a selectable control 306 that enables a user to display a drop-down menu 308 of status options. The user may choose to indicate that the user is available to accept messages, away from the client, or other status. The selected status can be displayed in messaging toolbar 304 to remind the user of the user's current status indicated to other users.

Messaging toolbar may also include a message control 310 to initiate an instant message. The user may hover a cursor over, click on, or double click on, message control 310 to initiate a new instant message. Alternatively, the user may hover the cursor over, click on, or double click on, another portion of messaging toolbar 304 to initiate a new instant message, bring an open chat window into focus, and the like. The operation performed may depend on a current status of the messaging client application. For example, if no chat session is currently active, selecting a portion of messaging toolbar 304 may open a new chat window and display a request for an identifier of another user to initiate the chat session. If a chat session is already active, selecting messaging toolbar 304 may bring the current chat window back into focus. Other controls may include buttons to activate an email system, to enter a search term, to display news, to display an advertisement, and the like.

Figure 4:
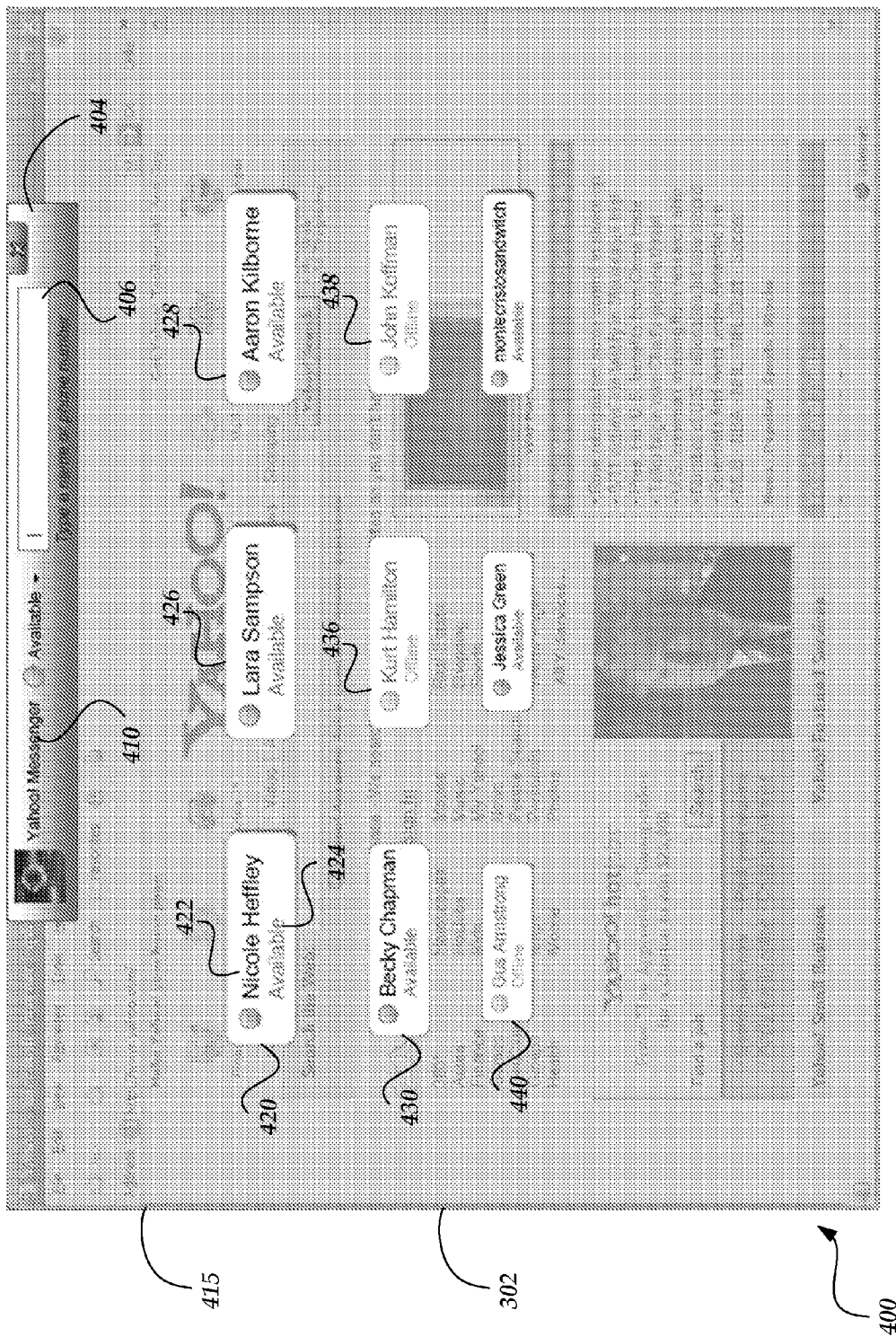
FIG. 4 shows a screen shot of a messaging client user interface, illustrating a sample contact list overlaying a display area.

FIG. 4 shows a screen shot of a display 400 that includes browser window 302 and a modified messaging toolbar 404. The modified messaging toolbar may result from a change of the messaging toolbar from that shown in FIG. 3 to that shown in FIG. 4 if a selectable control is activated. For example, if the user selects message control 310 of FIG. 3, the messaging toolbar may be changed to display a contact entry field 406 as shown in FIG. 4. Through contact entry field 406, the user may enter an identifier, such as an IM ID, an online portal user ID, an email address, a phone number, or the like. Upon submission of the identifier, the IM client may initiate an IM communication session with a device associated with the submitted identifier.

When the user selects message control 410, the IM client also displays a list of computing options such as a contact list 415. In this embodiment, contact list 415 is overlaid on the entire display 400. However, the IM client displays contact list 415 with a semi-transparent background, so that underlying browser window 302 is still partially visible. The semi transparent background provides a visual queue that contact list 415 is the current window in focus, and an immediate user action is expected, but suggests that the current focus is temporary. Alternatively, contact list 415 can be displayed with an opaque background to block other windows, with other varying degrees of transparency, with a pattern, or with other characteristics. In a further alternative, contact list 415 can be displayed on a portion of display 400.

The IM client displays individual contacts with relatively large contact selection elements. The large contact selection elements are generally easier to see than a conventional text list of contacts that may use a relatively small font. The size of each contact selection element, or the size of groups of contact selection elements, may vary based on one or more attributes of the corresponding contacts. For example, the contacts with which the user most frequently communicates may be displayed with the largest contact selection elements. One or more thresholds and/or weighting factors may be used to group contacts by size. In this example, the contacts with which the user most frequently interacts, are identified by large contact selection elements 420, 426, and 428. Contacts with which the user communicates less frequently, may be identified by smaller contact selection elements, such as contact selection elements 430, 436, and 438. Other display characteristics may include differing sizes, shapes, colors, patterns, images, animation, position in relation to other elements, and the like. Other sorting and/or filtering may be made available with additional selectable controls that may be displayed in modified messaging toolbar or displayed in other portions of display 400. The additional controls may be buttons, drop-down menus, radio buttons, and the like. Additional contact selection elements may be made visible with a scroll bar.

Some or all of the contact selection elements may include various information about the contacts. For instance, contact selection element 420 may include a text name 422 and a status indicator 424. Other information may include a phone number, a graphic, a thumbnail image, an indicator of the contact's current device type, indicators of different ways to communicate with the contact, such as by IM, by voice over internet protocol (VOIP) connection, and the like. The contact's status or other attribute may also affect the way the contact selection element is displayed. For example, a contact selection element 440 is shown in grayscale, indicating that the contact is offline. If a contact is available, the user may select a contact selection element to initiate a communication session with that contact. Each contact selection element may also include secondary controls for obtaining more information about a particular contact to aid the user in determining which contact to choose. For example, a mouse-over behavior could show additional information in the form of a text box, such as a tooltip. In another example, a small button may bring up additional information. In another embodiment, a toggle control, such as like a disclosure triangle may expand additional information. A variety of other secondary controls may be used.

Figure 5:
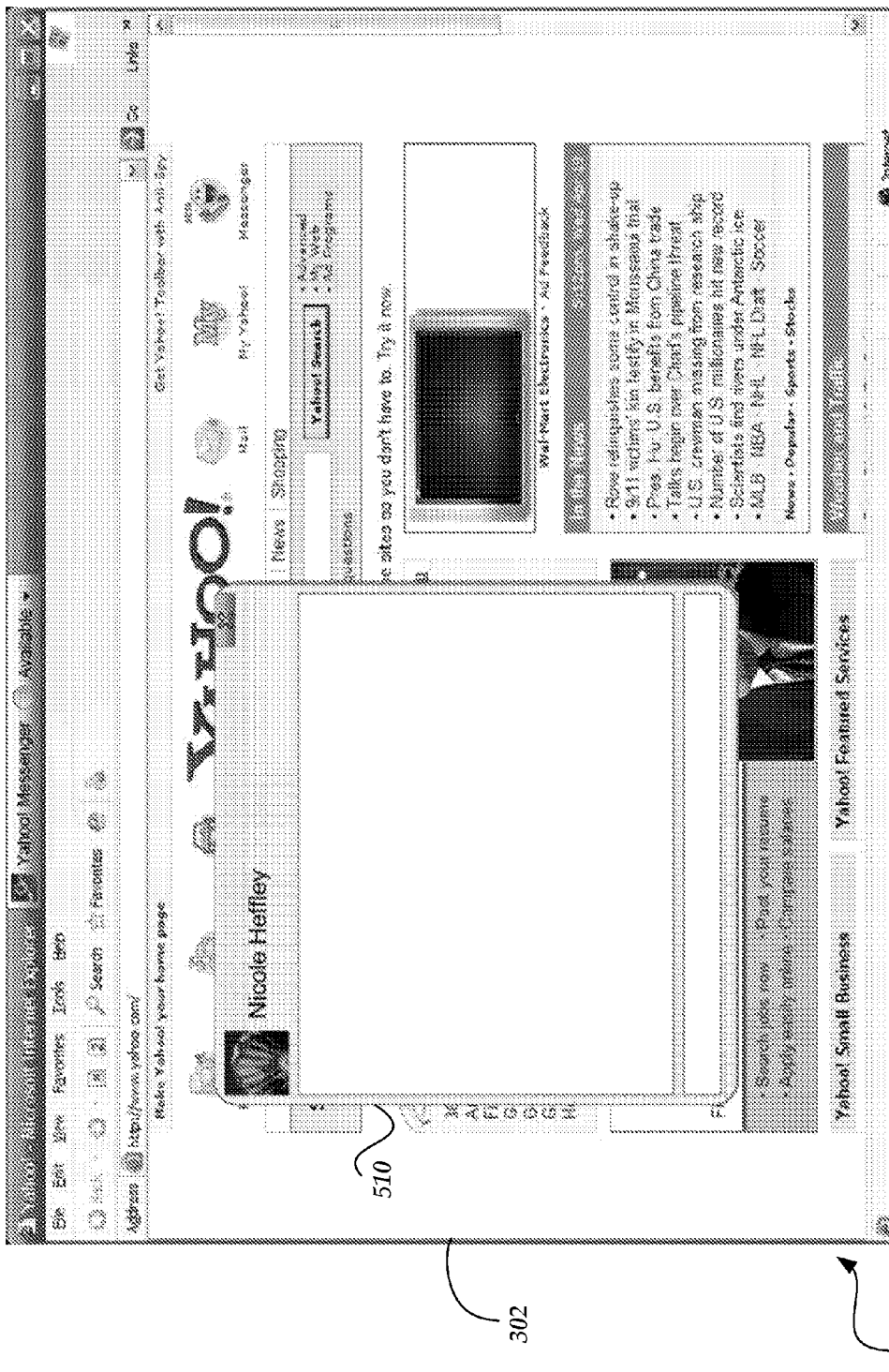
FIG. 5 shows a screen shot of a messaging client user interface, illustrating a sample text chat window overlaying a display area.

FIG. 5 shows a screen shot of a display 500 that includes browser window 302 and a sample text chat window 510. The chat window is displayed after the user selects one of the contact selection elements to initiate a chat session with the selected contact. The contact list is removed from the display and the chat window is overlaid on a portion of the display area. In another embodiment, the contact list may remain at least partial visible, so that the user may initiate another chat session or invite another contact to join the current chat session.

Illustrative Logic

Figure 6:
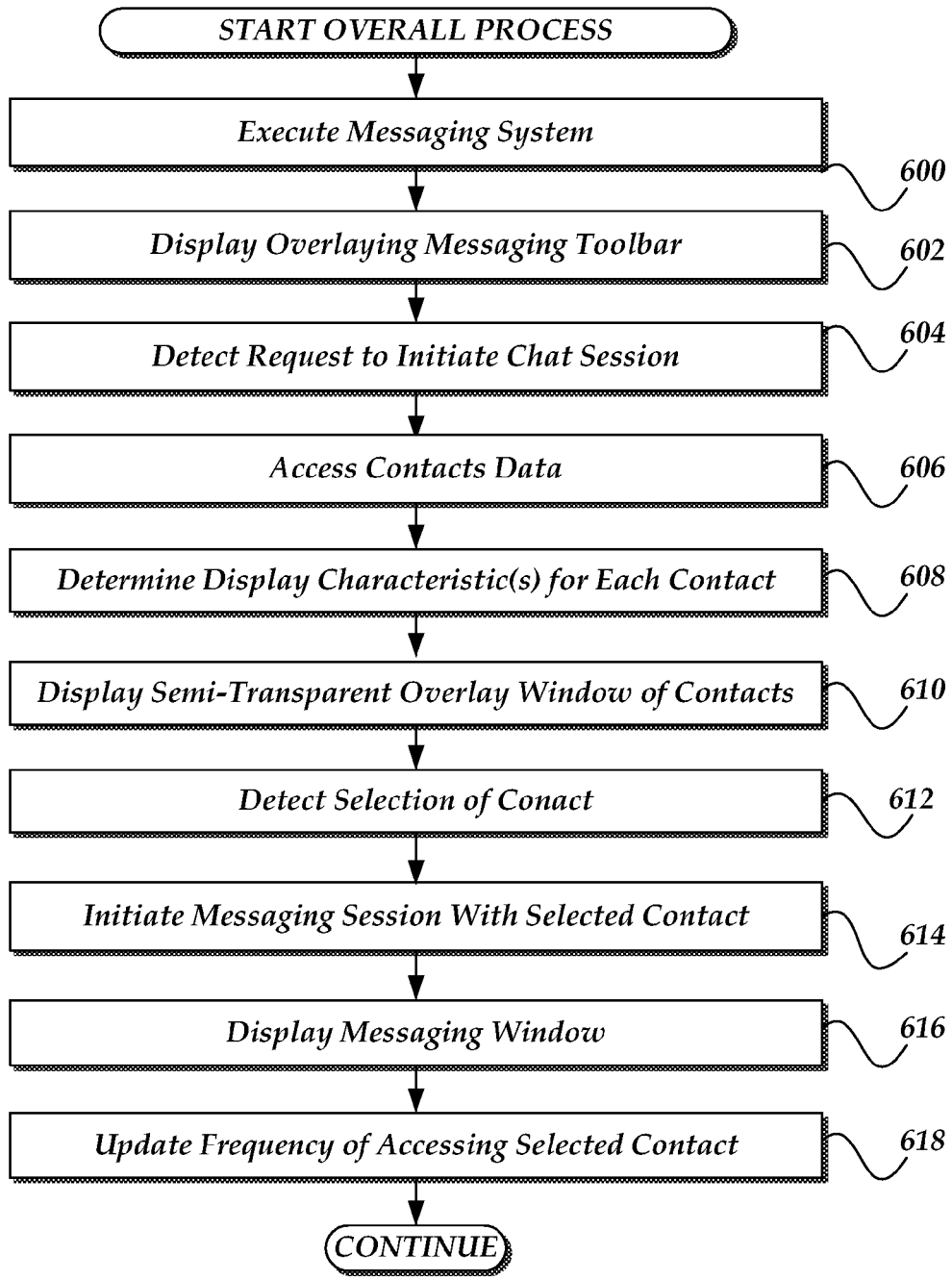
FIG. 6 illustrates an example logical flow diagram generally showing one embodiment of a process for providing an interface overlay for a message chat session.

FIG. 6 illustrates an example logical flow diagram generally showing one embodiment of a process for providing an interface overlay for a message chat session. At an operation 600, a messaging system begins execution. In this example embodiment, the messaging system is described as an instant messaging system executing on a client device and communicating with a server that relays messages between clients. Other messaging systems may include email systems, SMS systems, voice communication systems, and the like. A user may start the messaging system by selecting an icon, or the messaging system may begin execution upon powering on a client device. In another embodiment, the messaging system may execute on a server and be accessed with a browser. Upon execution, the messaging system displays a messaging toolbar at an operation 602. A display characteristic is set so that the messaging toolbar overlays other display elements, such as windows, icons, and the like.

At an operation 604, the messaging system detects a user action or other request to initiate a chat session, a new email, a voice call, or the like. The messaging system accesses a database of contact data, at an operation 606. The contact data may be stored on a local client with the messaging system and/or at a server. For each contact, the contact data includes a contact identifier, a display name, a current status, and the like. In this embodiment, the contact data also includes a frequency value that indicates the frequency with which the contact has engaged in communications with this messaging system. In another embodiment, the contact data may include a priority value assigned by a user of the messaging system to identify high priority contacts from lesser priority contacts. In yet another embodiment, the contact data may indicate a geographic distance between the contact and the executing messaging system. In still other embodiments, the contact data may indicate a level of shared interests, shared online behaviors, reputation, and/or other contact characteristics. Some or all of the contact characteristics may be dynamically determined at the time the request is detected to initiate a new chat session.

The contact data may also include one or more display characteristics that indicate how a contact display element should be displayed. Alternatively, one or more of the display characteristics may be detected or determined at the time the request is detected to initiate a new chat session. For example, the display characteristics may comprise a size at which a contact selection element will be displayed, a color, an order relative to other contact selection elements, a screen location, a status indicator symbol, a graphic, an image, and the like. Accordingly, at an operation 608, the messaging system determines display characteristics for each contact. The messaging system displays corresponding contact selection elements in a semi-transparent interface overlay window, at an operation 610. An example is shown in FIG. 4.

At an operation 612, the messaging system detects a user selection of a contact. The messaging system may detect a mouse click on one of the contact selection elements. Alternatively, the messaging system may receive a phone number or other identifier through the contact entry field. Voice command or other input means may also be used. The messaging system uses the corresponding identifier to initiate a messaging session at an operation 614. The messaging system may wait until the session is established or may immediately close the semi-transparent interface overlay window. At an operation 616, the messaging system displays a messaging widow, such as a chat window. The messaging system also updates information stored about the selected contact at an operation 618, such as the frequency with which the user communicates with the selected contact.

The above specification, examples, and data provide a complete description of the manufacture and use of the composition of the invention. However, many other embodiments may be implemented. For example, the invention may be embodied in application programs where the user selects one item from a set of many. Example selections include, but are not limited to:

Choosing an item from the results of a web search
Choosing a document to view from a selection of recently used ones on a client and/or network computer
Calling a phone number from the contents of an address book
Opening a web page from a set of recently viewed sites or from the user's bookmarks
Choosing a template or style to apply to a document Since many embodiments of the invention can be made without departing from the spirit and scope of the invention, the invention resides in the claims hereinafter appended.

What is claimed as new and desired to be protected by Letters Patent is:

1. A method, comprising:
    detecting an instruction to initiate a selection through a user interface; and
    displaying an interface overlay that includes a selection element for selectable enabling a computing option associated with the selection element, wherein a display characteristic of the selection element is based on an attribute of the computing option, and wherein the display characteristic includes at least one of the following: a size at which a contact element is displayed, a color, a screen location at which the selection element is displayed, an order of the selection element relative to other selection elements, or an animation, and where the attribute comprises a frequency with which the computing option is utilized.

2. The method of claim 1, wherein detecting the instruction comprises detecting selection of a toolbar, wherein the toolbar remains visible over other display elements.

3. The method of claim 1, wherein the interface overlay includes a semi-transparent background.

4. The method of claim 1, wherein the selection element represents a communication address of a contact from a plurality of contacts in a messaging system and wherein the computing option enables electronic communication with the contact represented by the selection element.

5. The method of claim 4, wherein the display characteristic comprises at least one of the following: a size, a color, and an animation.

6. The method of claim 1, wherein the selection element provides at least one of the following: an availability of the computing option and a secondary control for obtaining secondary information related to the computing option.

7. The method of claim 1, wherein the computing option comprises electronic communication comprising one of the following: an instant message, an email, and a voice communication.

8. The method of claim 1, further comprising:
    detecting selection element from a plurality of displayed selection elements;
    accessing data associated with the computing option that is associated with the selected selection element; and
    performing a computing operation based on the data associated with the computing option.

9. A non-transitory computer readable storage medium tangibly storing computer program instructions capable of being executed by a computer processor, the computer program instructions defining code for:
    detecting an instruction to initiate a selection through a user interface; and
    displaying an interface overlay that includes a selection element for selectable enabling a computing option associated with the selection element, wherein a display characteristic of the selection element is based on an attribute of the computing option, and wherein the display characteristic includes at least one of the following: a size at which a contact element is displayed, a color, a screen location at which the selection element is displayed, an order of the selection element relative to other selection elements, or an animation, and where the attribute comprises a frequency with which the computing option is utilized.

10. An apparatus, comprising:
    a processor;
    a storage medium for tangibly storing thereon program logic for execution by the processor, the program logic comprising:
        detecting logic executed by the processor for detecting an instruction through an input device to initiate a selection; and
        displaying logic executed by the processor for displaying an interface overlay that includes a selection element for selectively enabling a computing option associated with the selection element, wherein a display characteristic of the selection element is based on an attribute of the computing option, and wherein the display characteristic includes at least one of the following: a size at which a contact element is displayed, a color, a screen location at which the selection element is displayed, an order of the selection element relative to other selection elements, or an animation, where the attribute comprises a frequency with which the computing option is utilized.

11. An apparatus, comprising:
    a processor;
    a display in communication with the processor;
    an input interface in communication with the processor and with an input device; and
    a memory in communication with the processor and storing data and instructions causing the processor to perform operations, including:
        detecting an instruction through the input device to initiate a selection; and
        displaying an interface overlay that includes a selection element for selectively enabling a computing option associated with the selection element, wherein a display characteristic of the selection element is based on an attribute of the computing option, and wherein the display characteristic includes at least one of the following: a size at which a contact element is displayed, a color, a pattern, an image, a screen location at which the selection element is displayed, an order of the selection element relative to other selection elements, or an animation, wherein the attribute comprises a frequency with which the computing option is utilized.

12. The apparatus of claim 11, wherein the display characteristic comprises at least one of the following: a size, a shape, a color, a position, and an animation.

13. The apparatus of claim 11, wherein the instructions further cause the processor to perform an operation of displaying at least one other selection element with the display characteristic based on a further attribute associated with at least one other computing option, said further attribute being substantially the same as the attribute of the computing option.

14. The apparatus of claim 11, wherein the instructions further cause the processor to perform further operations including:
   arranging a plurality of computing options into an order based on values of the attribute associated with the plurality of computing options; and
   displaying a plurality of selection elements with display characteristics that indicate said values.

15. The apparatus of claim 11, wherein the interface overlay includes a semi-transparent background.

16. The apparatus of claim 11, wherein the interface overlay is displayed through a browser.

17. The apparatus of claim 11, wherein the apparatus comprises a mobile device.

18. A system, comprising:
   a contacts database storing information for communicating with a contact over a network; and
   a messaging application in communication with the contacts database and performing a plurality of operations including:
      receiving a request to establish a communication session;
      causing an interface overlay to be displayed that includes a contact control element associated with the contact and for selectively establishing an electronic communication with the contact; wherein a display characteristic of the contact control element is based on an attribute of the contact stored in the contacts database, and wherein the display characteristic includes at least one of the following: a size at which the contact element is displayed, a color, a screen location at which a selection element is displayed, an order of the selection element relative to other selection elements, or an animation.

19. The system of claim 18, wherein at least one of the contacts database and the messaging application are on a sever and are accessible through the network from a client.

* * * * *